United States Patent [19]

Fukino

[11] 4,043,691
[45] Aug. 23, 1977

[54] DEVICE FOR LOCKING A BODY TO BE MOUNTED

[75] Inventor: Kunihiro Fukino, Kawasaki, Japan
[73] Assignee: Nippon Kogaku K.K., Tokyo, Japan
[21] Appl. No.: 650,785
[22] Filed: Jan. 20, 1976
[51] Int. Cl.² ............................ F16B 21/00; F16L 37/00; G02B 7/02
[52] U.S. Cl. .................................. 403/322; 285/34; 292/256.65; 350/58; 403/326
[58] Field of Search ............ 350/58, 59, 60; 285/34, 285/35, 308; 403/322, 326; 292/256.65, 140, 170

[56] References Cited
U.S. PATENT DOCUMENTS

| 314,162 | 3/1885 | Ashton | 292/140 |
|---|---|---|---|
| 1,462,805 | 7/1923 | Gibson | 292/140 |
| 2,837,957 | 6/1958 | Hori | 403/326 |

Primary Examiner—Paul R. Gilliam
Assistant Examiner—Kenneth J. Dorner
Attorney, Agent, or Firm—Shapiro and Shapiro

[57] ABSTRACT

This invention provides a locking device for securely engaging a mounting body having a cylindrical end portion with a body having a projected end portion formed with an engaging portion. According to one embodiment, a resilient engaging member having an engaging portion engageable with said engaging portion of the body is provided. The elastic engaging portion is movable between a first position where it closely contacts with one of the side surfaces of the inner and outer surfaces of the projected end of the mounting body and a second position where the engaging portion is released from said one side surface. At the first position the mounting body is engageable with the body and at the second position both bodies are disenageable. Also there is provided with a connecting member penetrating the side wall of the cylindrical end portion of the mounting body and one end of the connecting member is secured to the engaging member; and a projecting pin is arranged at the other end of the connecting member; and an operating member having a groove inclined to the other side surface and engaged with the pin is provided, thereby the engaging member can be moved between said first and second positions when the operating member slidably moves.

6 Claims, 4 Drawing Figures

DEVICE FOR LOCKING A BODY TO BE MOUNTED

BACKGROUND OF THE INVENTION

1. Field of the Invention

This invention relates to a device for locking dismountably two bodies and more particularly to a device for locking a mounting body to a body, the outer periphery of the end thereof being projected (in this specification, the former body is designated as the mounting body for discriminating it from the latter body which will be referred to only as body).

2. Description of the Prior Art

According to the conventional locking device of the type as mentioned above, it is usual to lock two bodies with the aid of threads provided on two bodies, respectively. In this case, the locking is reliable and not easy to be disengaged; however, it is time consuming to connect or disconnect them. There is another push button type as seen in usual lens cap, lens hood, etc. for a camera. However, in such push button type locking device, the locking is too easily released when an unintentional external force is applied to the mounting body, especially to the hood part or push button thereof.

SUMMARY OF THE INVENTION

The main object of this invention is to provide a locking device for a mounting body which is not easily disengaged by an external force and is easy to connect and disconnect.

According to this invention, in securing a mounting body in place, two biasing forces are imparted to a push button and an engaging member in different directions, respectively, so that the mounting body is not released unless an external force simultaneously resisting both of the biasing forces is applied.

BRIEF DESCRIPTION OF THE DRAWING

FIGS. 1 through 3 show the first embodiment of this invention, and FIG. 1 shows its plan view, FIGS. 2A and 2B show the normal state of the locking device. FIG. 3 shows the structure similar to FIG. 2A but in this case the device is in its mounting and dismounting state.

DESCRIPTION OF THE PREFERRED EMBODIMENT

Figure 1:
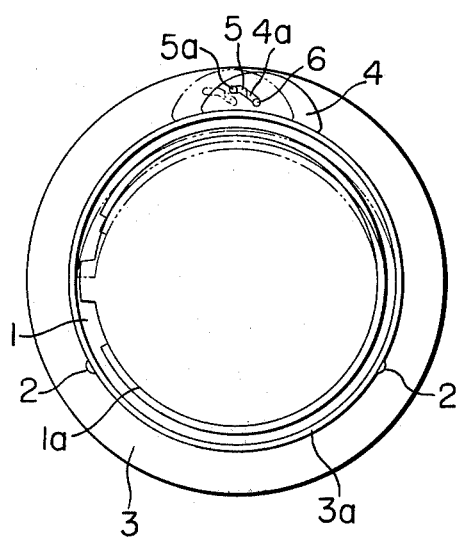

The explanation will be made of the first embodiment of this invention shown in FIGS. 1 through 3 where this invention is applied to a lens hood to be mounted on a phototaking lens of a camera. FIG. 1 shows a plan view of the lens hood in which an engaging member 1 having a threaded engaging part 1a is fixed to the inside of a fixed portion or wall 3a of the hood body 3 with the aid of two screws 2. The engaging member 1 is a ring shaped elastic body and has a strong restoration force against deflection. The portion 3a is cylindrical and projects from the mounting body 1.

Figure 2B:
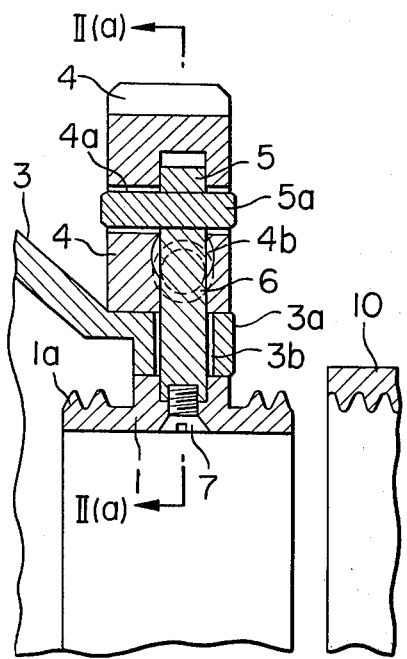
Figure 2A:
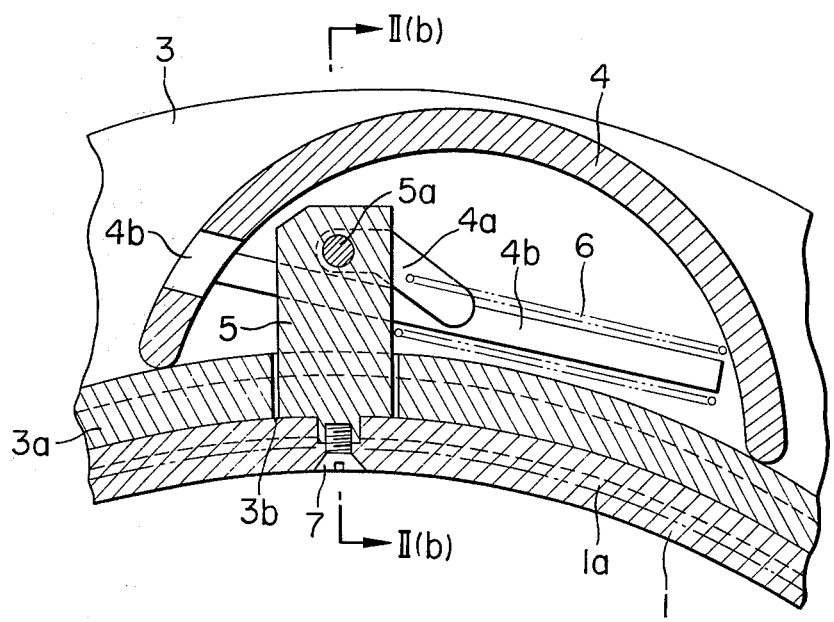
FIG. 2A shows the structure as seen in the arrow direction of II(a)—II(a) line in FIG. 2B, which shows the structure as seen in the arrow direction of II(b)—II(b) line in FIG. 2A.

On a portion of the outer peripheral surface of the portion 3a of the hood body 3, a push button 4 of substantially semicircular plate form is slidably provided. The inside of the pushbutton 4 has a hollow portion, and a groove 4a is provided inclined relative to the portion 3a. The groove 4a is made parallel to the portion 3a at the end remote from the portion 3a. In the hollow portion of the push button 4, is inserted a connecting piece 5 which, as shown in FIGS. 2 and 3, extends through an opening 3b in the portion 3a and is connected to the engaging member 1 by a screw 7. A pin 5a is fixed to the connecting piece 5 and the pin 5a is received in the groove 4a provided at the side walls of the hollow portion of the push button 4. At the side walls of the hollow portion of the push button 4, a linear insert portion 4b is provided to receive a spring 6 in substantially tangential relation with respect to the wall portion 3a. In the linear insert portion 4b the spring 6 is inserted in such a manner that one end of the spring abuts the connecting piece 5. The spring 6 has an energizing force in a direction substantially perpendicular to the radial directional force of the engaging member 1, and consequently the spring 6 normally biases the push button 4 in the rightward direction (FIG. 2A), so that the pin 5a of the connecting piece 5 normally is biased into engagement with the most remote end of the groove 4a. At this position the engaging member 1 contacts with the portion 3a. It is noted that, as shown in FIG. 1, the relative positions of the connecting piece 5 and the fixing screws 2 are such that the engaging member 1 can deflect by the movement of the connecting piece 5. In FIG. 2B, numerical reference 10 denotes the threaded front end of the phototaking lens which is the body as defined in the foregoing.

The operation of the described first embodiment will be explained.

FIG. 1 and FIGS. 2A and 2B show the normal state. For mounting or connecting the lens hood to the phototaking lens, it is necessary to push the push button 4 toward the fixing portion or cylindrical wall 3a and slide the button in the leftward direction from the position shown in FIG. 2A to the position shown in FIG. 3. Thus the push button moves leftwardly on the wall 3a against the biasing force of the spring 6. Consequently, the groove 4a also moves leftwardly and the pin 5a is restricted by the groove 4a and the confining opening 3b in the wall 3a so that the connecting piece 5 and the engaging member 1 are pushed downwardly as shown in FIG. 3, which is the state shown in FIG. 1 by the two-dot chain line. When the push button 4 is only pushed leftwardly, there is no downward force applied to the push button 4 and therefore, the pin 5a plays the role of a fixing pin and only when the push button 4 is pushed to the inclined direction, i.e. left upper side in the drawing. When the push button 4 is only pushed downwardly in the drawing, the push button 4 is restricted by the fixed portion or wall 3a and neither the push button 4 nor the engaging member 1 moves.

When the engaging member 1 is pushed downwardly, the diameter of the engaging member 1 becomes smaller than the inner diameter of the front end 10 of the phototaking lens so that after the engaging member 1 is inserted into the threaded portion 10 of the lens, and the external force applied to the push button 4 is released, both threads engage with each by the restoration force of the elastic engaging member 1, and the mounting body, i.e. lens hood, is locked at its engaging position with the body, i.e. the phototaking lens.

The release of the locking or engaging can be made in the same way as in the locking operation.

Now the explanation will be made on the second embodiment shown in FIG. 4 where a mounting body is mounted on a body having a cylindrical rectangular cross section.

Figure 3:
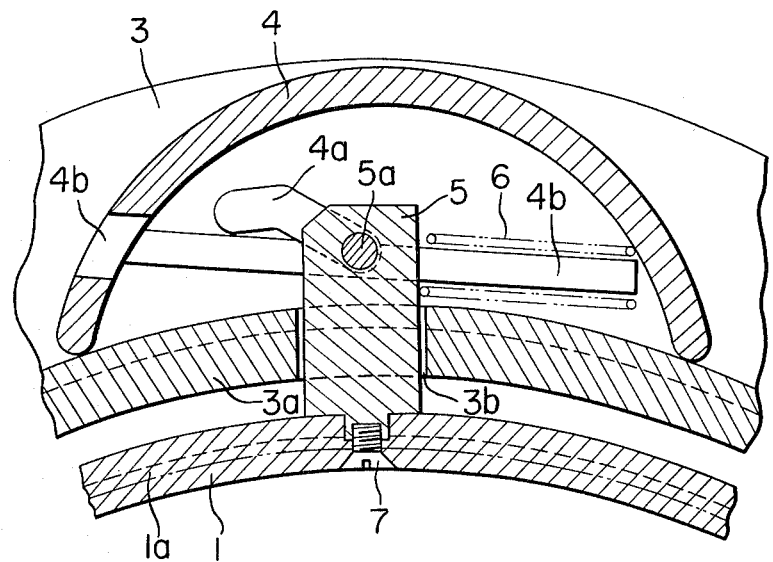
Figure 4:
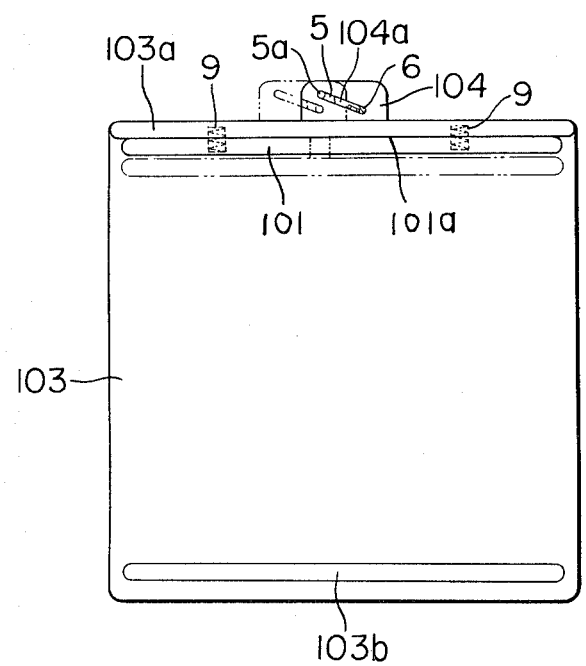
FIG. 4 shows a plan view of a second embodiment of this invention.

The same reference numerals as those shown in FIGS. 1 through 3 designate the similar elements in FIG. 4. A cover 103 is the mounting body and is provided with an integral fixed or wall portion 103a and a second engaging portion 103b. A strong tension spring 9 is provided between an engaging portion 101 and the fixed portion 103a so as to normally urge the engaging portion 101 toward the fixed portion 103a. Consequently, when a push button 104 having the same structure as of the push button in the first embodiment is pushed leftwardly in FIG. 4, the engaging portion 101 is pushed downwardly against the tension spring 9, so that after the engaging portions 101 and 103b of the cover 103 is inserted into the body, the external force applied to the push button 104 is released, and the cover is locked at the engaging positions with the body.

Similarly, as in the first embodiment, the uppermost end portion of the groove 104a can be made parallel with the fixed portion 103a, and if the engaging portion 101a and the second engaging portion 103b are made as mating threaded engaging portions it is possible to obtain the reliable lock which cannot be disengaged by an external force which does not change the distance between two engaging portions.

In the second embodiment, the engaging portions directly engaging with the body are separately made, whereas in the first embodiment, they are provided by the integrally made engaging portions.

Furthermore, in both embodiments, the engaging portion is biased outwardly to engage it with the inner periphery of the body. However, it is possible to bias the engaging portion inwardly to engage it with the outer periphery of the body by exchanging the respective elements to make the fixed portion of the body as the reference.

As explained in the foregoing, according to this invention, in sandwiching the fixing portion the biasing forces are applied in the different directions to the push button and the engaging portion, respectively, and unless the external force simultaneously resisting said two biasing forces is applied, the locking is stable. Also, even though the external force works on the body and the mounting body so as to urge the engaging portion to deform, it is not possible to do so because the engaging member engages with the inclined portion of the groove through the connecting member so that the mounting body will not intentionally be disengaged from the body.

Moreover, as shown in the first embodiment, the portion of the groove most remote from the fixing portion or wall is made parallel with the fixing portion so that the deformation of the engaging portion by the external force working on the body and the mounting body is completely avoided.

I claim:

1. A locking device for releasably connecting a mounting body having a cylindrical end portion defined by a wall projected therefrom with a body having a projected end formed with a mating portion, the device comprising:
   a. an engaging member having an engaging portion engageable with the mating portion of the body, the engaging member being movable between a first position where the engaging member closely contacts a side of the wall so that the engaging portion is in engagement with the mating portion and a second position where the engaging portion is released from said mating portion so that the mounting body is disengageable from the body;
   b. a connecting member extending through said wall and mounted for sliding movement, one end of the connecting member being secured to said engaging member;
   c. a projecting pin provided at the other end of the connecting member; and
   d. an operating member slidably mounted relative to said wall, the operating member having a groove inclined relative to the sliding direction of the operating member and engageable with said projecting pin so as to move the engaging member between the first and second positions when the operating member slidably moves.

2. A locking device according to claim 1, further comprising a first biasing means to bias the engaging member toward the first position.

3. A locking device according to claim 2, wherein the groove of the operating member has a portion parallel with said wall at the position most remote from the wall.

4. A locking device according to claim 3, comprising a second biasing means provided between the connecting member and the operating member for biasing the projecting pin toward the parallel portion of the groove.

5. A locking device according to claim 4, wherein the engaging member is positioned on the inner side of said wall.

6. A locking device according to claim 5, wherein the wall is circular and the elasticity of the engaging member plays a role of the first biasing means.

* * * * *